United States Patent Office 3,769,373
Patented Oct. 30, 1973

3,769,373
POLYMERISATION OF UNSATURATED HYDROCARBONS
Hugh Wilma Boulton Reed and Alan John Wilkinson, Norton-on-Tees, England, assignors to Imperial Chemical Industries Limited, London, England
No Drawing. Continuation-in-part of abandoned application Ser. No. 703,732, Dec. 19, 1957. This application May 27, 1959, Ser. No. 816,050
Claims priority, application Great Britain, Dec. 27, 1956, 39,342/56; May 30, 1958, 17,306/58; June 16, 1958, 19,158/58
Int. Cl. C08f 3/02, 3/08
U.S. Cl. 260—93.7
17 Claims

ABSTRACT OF THE DISCLOSURE

A component of an olefine polymerisation catalyst is prepared by the reaction between aluminum and titanium tetrachloride preferably under reflux conditions in the presence of aluminum chloride. The product has the approximate empirical formula $AlTi_3Cl_{12}$ and when ball-milled forms a highly active polymerisation catalyst in combination with an organo-aluminum compound.

This application is a continuation-in-part of our copending application Ser. No. 703,732, filed Dec. 19, 1957, now abandoned.

The present invention relates to new compositions of matter useful as components of catalysts for polymerising olefines containing a vinyl group. More particularly it relates to catalysts prepared from such new compositions of matter and to the polymerisation of olefines with such catalysts.

It has been proposed to polymerise propylene by a process comprising bring it into contact with a catalyst prepared by mixing titanium trichloride with aluminium triethyl, when polypropylene is obtained having a high proportion of isotactic polypropylene. A problem encountered in this process arises from the fact that the polymer formed contains the residues of the catalyst and that elaborate procedures are necessary for the subsequent removal of such catalyst residues.

One object of the invention is to provide a new and useful catalyst component for polymerising propylene to polypropylene containing a high proportion of isotactic polypropylene in which the catalyst residues may be more readily removed than the catalyst residues from polypropylene prepared by the said process. A further object of our invention is to provide a component for a catalyst of greater activity than the catalyst used in the said process, thus enabling a greater rate of polymerisation and greater yields of polymer to be obtained. These and other objects of our invention will become apparent from the ensuing description thereof.

Briefly, our invention provides a new and highly useful composition of matter, suitable as a component of a catalyst useful for polymerising at least one olefine containing a vinyl group, said composition comprising the reaction product of titanium tetrachloride and aluminium freed from any unreacted titanium tetrachloride, said product having a characteristic X-ray diffraction pattern showing that it is a crystalline compound of aluminium, titanium and chlorine. The invention also provides a new and useful composition of matter suitable as a component of a catalyst useful for polymerising at least one olefine containing a vinyl group which contains aluminium, titanium and chlorine, which gives a Debye-Scherrer X-ray diffraction pattern which is distinguishable from that of a mixture of aluminum chloride and titanium trichloride with lines representing inter-planar spacings of substantially 5.23, 5.03, 4.49, 2.99, 2.503, 1.939, 1.782, 1.684, 1.441 and 1.117 angstrom units. Our catalyst component is shown to have a composition essentially of $Al(TiCl_4)_3$.

This composition of matter may very suitably be produced by reacting titanium tetrachloride with aluminium preferably in the presence of an aluminium halide, e.g. aluminium chloride, aluminium bromide or aluminium iodide, at a temperature in the range 80 to 220° C. The reaction is most conveniently carried out at temperatures within the range 100 to 200° C. Preferably, the titanium tetrachloride should be in excess of the amount required to react completely with the aluminium in order to avoid contamination of the reaction product by metallic aluminium, although such contamination does not impair the catalytic properties of the catalytic material of this invention. Therefore, it is not essential to use an excess of titanium tetrachloride. After completion of the reaction, the excess, if any, of titanium tetrachloride may be separated from the reaction product, preferably by distillation. It is also desirable that the aluminium used should be in a finely divided form and that the aluminium halide should be freshly sublimed. If an aluminium halide is not used the aluminium should be capable of giving fresh surfaces, e.g. pigment grade aluminium in conjunction with a hydrocarbon liquid, e.g. benzene or petroleum ether.

In order to remove the heat of reaction, the reaction between titanium tetrachloride and aluminium is conveniently carried out under reflux conditions. It may be carried out in the presence of an inert diluent, e.g. a liquid hydrocarbon, such as petroleum ether, methyl cyclohexane, cyclohexane, n-hexane, benzene, toluene, the xylenes or mixtures thereof and hydrogenated petroleum distillates such as hydrogenated diesel oil. It can be very conveniently carried out in the absence of such inert diluent by refluxing the titanium tetrachloride at atmospheric pressure. The pressure should be at least sufficient to maintain the titanium tetrachloride and the inert diluent, if present, in the liquid phase.

The compositions of matter thus obtained have elementary compositions which may vary but in general they approximate to an atomic ratio Al:Ti:Cl of 1:3:12. The properties of this material are very different from those of a mixture of aluminium chloride and titanium trichloride and it is believed that the material consists essentially of aluminium chlorotitanite $Al(TiCl_4)_3$ or $\frac{1}{3}(AlCl_3):TiCl_3$. The composition of matter is stable up to 250° C. and gives a characteristic X-ray diffraction pattern showing that it is crystalline. Nuclear magnetic resonance measurements indicate that our new composition of matter is a compound of aluminium, titanium and chlorine.

The catalytic material suitable for the polymerisation of at least one olefine containing a vinyl group is prepared by reacting a composition of matter as aforesaid with an organo-compound of aluminum. It is believed that these reagents react together to form a catalyst. It is a particular object of this invention to provide a process for the polymerisation of olefines in which at least one olefine is brought into contact with the reaction medium comprising this catalytic material. The organo-compound should contain at least one hydrocarbon radical attached to the atom of aluminium, any residual valencies being satisfied by hydrogen or halogen atoms, e.g. chlorine or bromine atoms. Suitable hydrocarbon radicals include alkyl, alkenyl, alkynyl, cycloalkyl, aryl and aralkyl radicals of which alkyl is preferred. More specifically suitable hydrocarbon radicals include lower alkyl radicals such as methyl, ethyl, n-propyl, n-butyl, n-amyl, iso-propyl, iso-butyl, tert.-butyl, isoamyl; higher alkyl radicals such as n-hexyl, n-heptyl and n-octyl; cycloalkyls such as cyclopentyl and cyclohexyl; alkenyl radicals such as iso-propenyl, propenyl, butenyl, and cyclohexenyl; alkynyl radicals such as ethynyl, prop-2-ynyl and but-3-ynyl; and aryl and aralkyl radicals such as phenyl, p-tolyl, benzyl and phenyl alkyl radicals such as 2-phenyl-ethyl.

The organo-compounds of aluminium which are particularly effective are those containing an alkyl group or groups, preferably for economy alkyl groups having not more than 5 carbon atoms. The other substituents, if any, of the aluminium may be halogen, e.g. chlorine or bromine, or hydrogen. Examples of very suitable organo-compounds of aluminium are the aluminium alkyls, aluminium alkyl halides and aluminium alkyl hydrides. More specifically suitable organo-compounds of aluminuim include the tri-lower alkyls such as trimethyl, triethyl and tripropyl aluminiums; tri-higher alkyls such as tri-n-octyl aluminium; aluminium alkyl halides such as diethyl aluminium chloride or bromide, dimethyl aluminium chloride or bromide, dipropyl aluminium chloride or bromide and di-n-octyl aluminium chloride; lower alkyl aluminium dihalides such as ethyl aluminium dichloride and n-butyl aluminium dichloride; and mixtures of such chlorides with dialkyl aluminium chlorides, e.g. ethyl aluminium sesquichloride and aluminium alkyl hydrides such as aluminium dipropyl hydride and aluminium di-n-octyl hydride. Complex alkyls of aluminium and an alkali metal such as sodium, potassium or lithium aluminium alkyls in which each alkyl group contains up to 5 carbon atoms e.g. lithium aluminium tetrapropyl may also be used.

The polymerisation process of this invention is applicable to the production of solid polymers of ethylene and other olefines containing the vinyl group e.g. propylene, butene-1 and styrene. Mixtures of olefines may be polymerised. It is particularly useful for the production of solid polypropylene containing a high proportion of crystalline (isotactic) polypropylene.

It is a further feature of this invention that if the organo-compound is a dialkyl aluminium halide a highly efficient process for the polymerisation of olefines results which has a number of surprising and highly important advantages over the process of this invention in which aluminium alkyls alone are used. For example, for the polymerisation of propylene to which this invention is particularly applicable, a solid polymer is obtained in high yield containing more than 90% of the important isotactic polymer and which may have a bulk density of greater than 0.4, particularly when the product of reacting titanium tetrachloride with aluminium is ground in the dry state before being mixed with the dialkyl aluminium halide. The production of a polymer having a high bulk density is of considerable importance since it enables the vessels used in, for example, the polymerisation process and processes for the further treatment of the polymer and in the storage and transport of the polymer to be smaller than they would otherwise need to be. A further very important advantage of this latter process is that it provides a polymer which is particularly amenable to further treatment for the removal of metal containing catalyst residues, particularly by the use of 3,5,5-trimethyl hexanol-1 or other higher alcohol according to the process of our copending application Ser. No. 724,849, filed Mar. 31, 1958.

The dialkyl aluminium halide may be a chloride or bromide, of which the chloride is particularly preferred. The alkyl group may very suitably be methyl, ethyl and propyl. A very suitable dialkyl aluminium halide is diethyl aluminium chloride. If desired, mixtures of dialkyl aluminium halides may be used. For reasons of economy it is preferred that the alkyl group has up to 5 carbon atoms. However, it should be pointed out that this invention is not restricted to the use of lower alkyl aluminium halides.

It is a further particular feature of this invention to use the dialkyl aluminium halide in combination with an aluminium trialkyl, preferably in an amount between 5 and 20 molar percent of the dialkyl aluminium halide. In this way, the rate of polymerisation can be further increased in a very effective manner. The aluminium trialkyl may be, for example, aluminium trimethyl, aluminium triethyl and aluminium tripropyl. Other aluminium trialkyls containing higher alkyl groups containing up to, for example, twelve carbon atoms, may be used. A very suitable combination is dialkyl aluminium chloride and aluminium triethyl.

The reaction product of titanium tetrachloride and aluminium may be comminuted, for example, in a ball-mill and preferably in the dry state before reacting it with a dialkyl aluminium halide to form the material which effects the polymerisation of olefines. In this way, the activity of the said material is increased without substantially reducing the proportion of isotactic polymer produced, for example, in the polymerisation of propylene. This is a most surprising result since if the dialkyl aluminium halide is replaced by an aluminium trialkyl the same comminution procedure while also giving an increase in activity leads to a substantial decrease of the proportion of isotactic polymer.

The organo-compound of aluminium and the aforesaid composition of matter may be reacted together in a wide range of molecular ratios. To polymerise propylene to solid polymers containing a high proportion of crystalline polymers, molecular ratios within the range 1:10 to 10:1 are very suitable. It is preferred that the molecular ratio is within the range 1:1 to 4:1, ratios up to 8:1 may however be usefully employed when dialkyl aluminium halides are used. By molecular ratios of the organo-compound of aluminium and the aforesaid new composition of matter is meant the ratio of moles of the organo-compound to gram atoms of titanium in the said product. The organo-compound of aluminium and the aforesaid composition of matter may suitably be reacted together by mixing the same or by mixing solutions of them in hydrocarbon liquids, conveniently at atmospheric pressure and room temperature but other temperatures and pessures may be used since they are not critical e.g. tempeatures from 0° C. to 100° C. may be used. The mixing time may be of any convenient duration e.g. times from, say, ½ minute up to several hours.

It is preferred to operate the polymerisation process of this invention at temperatures within the range 20° to 100° C. However, temperatures above and below the preferred range may be used, e.g. temperatures above 100° C. such as 200° C. It is preferred to operate at pressures within the range 1 to 50 atmospheres absolute but pressures above the preferred range may be used, for instance, pressures up to 1000 atmospheres. The proportions of olefine catalyst may be widely varied, according to the invention, but generally speaking, from a very low concentration of olefine in the reaction medium such as when gaseous olefine is passed through the reaction medium at atmospheric pressure up to several thousand moles of olefine per mole of catalyst.

The olefin may be polymerised in the liquid state and the pressure should then be at least sufficient to maintain the olefin in the liquid state. Alternatively, the olefin in the gaseous state may be brought into contact with the reaction medium, which should then comprise a liquid inert under the conditions of the polymerisation process. The said liquid may be a paraffinic alicyclic or aromatic hydrocarbon. The liquid may be benzene, particularly when the polymerisation process is operated at atmospheric pressure. It may also be a petroleum ether fraction boiling in the range 20° to 120° C. The said liquid may also be propane, or mixtures of butanes, or liquid monomer, or mixtures thereof either alone or with other hydrocarbon liquids, for example, liquid propylene may be used in the polymerisation of propylene. When benzene is used it has been found contrary to expectation that it does not involve a substantial decrease in the proportion of isotactic polypropylene formed in the polymerisation of propylene according to this invention. Further, although it would then be expected that the polymer produced in the presence of benzene would swell and be difficult to treat, for example, for the removal of catalyst residues, it has been found on the contrary that when dialkyl aluminium halides are used in the catalyst of this invention, these catalyst residues the very easily removed by use of small amounts of 3,5,5-trimethyl hexanol-1.

Water and oxygen should not be present in the apparatus in which the polymerisation process of this invention is effected in more than relatively small amounts since they decompose organo-compounds of aluminium. Air is suitably displaced from the apparatus by flushing out with nitrogen. The reaction between aluminium chloride and titanium tetrachloride is also preferably carried out in the absence of water and oxygen and is conveniently carried out in an atmosphere of dry nitrogen.

It is a particular feature of the polymerisation process of this invention to treat the polymer produced for the removal of metal containing catalyst residues by the process of our copending application Ser. No. 724,849, filed Mar. 31, 1958. In this treatment it is only necessary to add a higher alcohol, e.g. 3,5,5-trimethyl hexanol-1 to the suspension of polymer in the liquid reaction medium. An amount of alcohol stoichiometrically equivalent to the amount of catalyst residue may be effective and only a short time of contact between the alcohol and polymer is necessary to complete the treatment.

Our invention is illustrated but in no way limited, by the following examples.

EXAMPLE 1

A mixture of 5 gm. finely powdered aluminium, 2 gm. freshly ground aluminum chloride, 120 gm. titanium tetrachloride and 120 ml. petroleum ether, boiling range 100–120° C., contained in a flask fitted with a reflux condenser was boiled under reflux conditions for 6 hours. The petroleum ether and most of the excess titanium tetrachloride were then distilled off and the residual solid heated at 200° C. under a pressure of 1 mm. Hg absolute for 12 hours to remove any remaining titanium tetrachloride. 112 gm. of a pale purple powder were obtained. The powder was used in the preparation of a reaction medium for the following experiments which demonstrate the polymerisation of propylene.

In experiment 1, 10 gm. of the powder were suspended in 1 litre petroleum ether (boiling range 100–120° C.) contained in a flask fitted with a reflux condenser, a gas inlet tube and a dropping funnel and the air in the flask displaced by an atmosphere of propylene. 16 gm. aluminum tripropyl were added to the contents of the flask which were then heated to 80° C. causing a colour change from purple to brown. While maintaining the temperature of the reaction medium thus prepared at 80° C. propylene was passed into the flask at 80 litres per hour so that it contacted the surface of the reaction medium. Absorption of propylene was practically complete during the first hour.

After 2 hours the flow of propylene was stopped, the contents of the flask cooled, and 2 litres methanol added. The precipitated powdery polypropylene was then filtered off and boiled with methanolic hydrochloric acid to give finally 149 gm. dry polymer having an ash content of less than 0.1%. 15% of this polymer was soluble in boiling ether and a further 10% in boiling heptane. The insoluble residue gave an X-ray diffraction pattern which showed it to be a crystalline polymer containing little amorphous material.

A second polymerisation experiment was carried out under identical conditions to those described above except that the temperature of the reaction medium was maintained at 50° C. and the flow of propylene continued for 4½ hours. Absorption of propylene was much slower than in the first experiment. 55 gm. solid polymer were obtained of which 23% was soluble in ether.

EXAMPLE 2

Aluminium, aluminium chloride and titanium tetrachloride were reacted together as described in Example 1 except that methylcyclohexane was used as the diluent instead of petroleum ether. The product thus obtained was used in the polymerisation of propylene as described in the first experiment of Example 1, the flow of propylene being maintained for 3 hours. 149 gm. solid polypropylene were obtained of which 16% was soluble in ether.

EXAMPLE 3

10 gm. aluminium powder and 10 gm. freshly sublimed aluminium chloride were added to 500 cc. titanium tetrachloride under an atmosphere of nitrogen. The mixture was stirred and the temperature gradually raised to about 130° C. when a vigorous reaction commenced. Heating was then discontinued until the rate of reaction moderated and the reaction mixture then heated under reflux conditions for 17 hours. The excess titanium tetrachloride together with free aluminium trichloride was then distilled off at atmospheric pressure and the residual solid heated at 200° C. under 0.2 mm. Hg absolute pressure for 5 hours to remove any remaining titanium tetrachloride. 174 gm. of a pale purple solid were obtained which analysis showed to contain 23.61% titanium, 5.32% aluminium and 68.85% chlorine.

The Deybe-Scherrer X-ray diffraction pattern of the solid was determined. Lines were identified corresponding to interplanar spacings of 5.87, 5.23, 5.03, 4.49, 2.99, 2.91, 2.87, 2.69, 2.503, 2.106, 1.939, 1.885, 1.782, 1.761, 1.684, 1.641, 1.507, 1.464, 1.441, 1.255, 1.171, 1.128, 1.117, 1.019, 1.006, 0.996, 0.977 and 0.963 angstrom units. The error in measurement was estimated to be ± 0.06 A. at a spacing of 5.03 A and ± 0.002 A. at a spacing of 1.441 A. These data and nuclear magnetic resonance measurements indicated that this solid did not contain aluminium trichloride. The solid obtained as described above was ground in the dry state in a ball-mill for 16 hours and then used in the polymerisation of propylene using an apparatus similar to that employed in the first experiment of Example 1. 9 gm. of the ground solid and 11.5 gm. aluminium triethyl were added to 2 litres dry petroleum ether (boiling range 60° to 80° C.) saturated with propylene and contained in a 3-litre flask. Purified propylene containing less than 0.01% methyl acetylene was brought into contact with the contents of the flask at a rate of 40 litres/hr. The temperature of the reaction mixture rose spontaneously to 60° C. and was then maintained at this value. After 4 hours the flow of propylene was discontinued, the contents of the flask cooled, and then added to 6 litres of methanol. The precipitated polymer was then separated by filtration, washed with hot methanol and dried in a vacuum oven at 60° C. 302 gm. granular, white solid polypropylene were obtained, having an ether solubility of 15.6% and an ash content of 0.2%.

EXAMPLE 4

4 gm. aluminium powder, 4 gm. aluminium chloride and 350 gm. titanium tetrachloride were stirred together and boiled under reflux conditions for 6 hours. Most of the excess titanium tetrachloride was then distilled off and the residual solid heated at 200° C. under 1 mm. Hg absolute pressure for 12 hours to remove any remaining titanium tetrachloride. 84 gm. of a pale purple powder were obtained.

11.4 gm. aluminium triethyl were added as a solution in 125 mls. methylcyclohexane to 2 litres benzene contained in a flask fitted up as described in Example 1 and from which air had been displaced by propylene. 10.0 gm. of the purple powder obtained as described above and which had been ground in a ball-mill were then introduced into the flask as a slurry in 100 ml. benzene. Purified propylene was passed into the flask at 40 litres/hour. The reaction mixture became almost black and the temperature rose spontaneously to 57°. After 6 hours, the rate of absorption of the propylene which initially was complete, began to fall off and the flow of propylene was stopped. The contents of the flask were then cooled, and added to 4 litres methanol. The precipitated polymer was filtered off and boiled with methanolic hydrochloric acid to give finally 395 gm. dry polypropylene of which 22% was soluble in ether.

EXAMPLE 5

6.9 gm. aluminium triethyl dissolved in 75 ml. methylcyclohexane were added to 1 litre petroleum ether (boiling point 60–80° C.) contained in a flask fitted up as described in Example 1 and from which air had been displaced by ethylene. 4.0 gm. of the purple powder obtained as described in Example 4 and which had been ground in a ball-mill were introduced into the flask as a slurry in 50 ml. petroleum ether (boiling point 60–80° C.). Ethylene was passed into the flask at 40 litres/hour, the temperature rising spontaneously to 52° C. Absorption of ethylene was almost complete. After 6 hours, the experiment was terminated by the addition of 50 ml. methanol to the contents of the flask, the polymer filtered off and boiled with methanolic hydrochloric acid to give finally 264 gm. dry polyethylene.

EXAMPLE 6

The pale purple solid prepared as in Example 3 (0.5 g., containing 0.0025 gram atoms of titanium) was dry ball milled for 19 hours under dry nitrogen and then suspended in petroleum ether (1 litre, B.P. >120° C.) which contained triethyl aluminium (0.03 moles). The suspension was placed in a 2 litre autoclave from which oxygen and traces of water had been removed by flushing out with dry nitrogen; ethylene was then added to raise the pressure in the autoclave to 200 p.s.i. The temperature of the autoclave rose to 59° as the reaction started spontaneously. After 35 minutes no ethylene was left. Polythene (79 g.) was obtained.

EXAMPLE 7

10 gm. aluminium powder and 10 gm. freshly sublimed aluminium chloride were added to 500 cc. titanium tetrachloride under an atmosphere of nitrogen. The mixture was stirred and the temperature gradually raised to about 130° C. when a vigorous reaction commenced. Heating was then discontinued until the rate of reaction moderated and the reaction mixture then heated under reflux conditions for 17 hours. The excess titanium tetrachloride together with free aluminium trichloride was then distilled off at atmospheric pressure and the residual solid heated at 200° C. under 0.2 mm. Hg absolute pressure for 5 hours to remove any remaining titanium tetrachloride. 174 gm. of a pale purple solid were obtained which analysis showed to contain 23.61% titanium, 5.23% aluminium and 68.85% chlorine.

32.2 gm. of this solid product were ground in the dry state for 24 hours and then mixed in a reactor with 75 litres dry petroleum ether and 147 gm. aluminium diethyl chloride as a molar solution in methyl cyclohexane. The temperature of the mixture was raised to 70° C. and while maintaining this temperature propylene (497 moles) was introduced into the reactor at a rate sufficient to maintain a pressure of 80 lb./sq. in. After 5½ hours the flow of propylene was discontinued. The temperature was maintained at 70° C. for a further 15½ hours by which time the pressure had fallen to 26 lb./sq. in.

2540 gm. 3,5,5-trimethyl hexanol-1 were then added to the polymer slurry and the mixture stirred at 75° to 80° C. for 1 hr. The polymer was separated by centrifuging; it contained 6.8% of material soluble in boiling ether. The polymer was then three times redispersed in petroleum ether at 70° C. and separated by centrifuging. After steam distillation of the residual petroleum ether and drying, 12,726 gm. polymer were obtained, having a solubility in boiling ether of 0.7%, an ash content of 0.02% and a bulk density of 0.435 gm./ml.

EXAMPLE 8

61.2 gm. aluminium diethyl chloride and 6.4 gm. aluminium triethyl both as molar solutions in methyl cyclohexane were mixed in a reactor with 73 litres dry petroleum ether and 28 gm. of the solid product obtained by reacting titanium tetrachloride with aluminium as described in Example 7 and subsequently ground in the dry state for 24 hours. Propylene (497 moles) was then introduced into the reactor to maintain a pressure of 80 lb./sq. in. with the temperature of the reaction mixture maintained at 70° C. After 7 hrs. the flow of propylene was discontinued and the temperature maintained at 70° C. for a further 16 hrs. by which time the pressure had fallen to 35 lb./sq. in.

3820 gm. 3,5,5-trimethyl hexanol-1 were then added to the polymer slurry and the mixture stirred for 1 hr. at 75° to 80° C. The polymer was then separated and washed with petroleum ether, steamed and dried as described in Example 7. 12,852 gm. polymer were finally obtained having a solubility in boiling ether of 0.2%, an ash content of 0.01% and a bulk density of 0.470 gm./ml.

The solubility in boiling ether of the polymer before washing with petroleum ether was 10%.

EXAMPLE 9

In a first experiment 6 gm. diethyl aluminium chloride, 0.57 gm. aluminium triethyl and 9 gm. of the solid product obtained by reacting titanium tetrachloride with aluminium as described in Example 7 and which had been ground in the dry state for 16 hrs. were introduced into a 3 litre flask containing 2 litres petroleum ether which had been dried over sodium and saturated with propylene. Propylene containing less than 0.01% methyl acetylene was then passed into the mixture in the flask for 4 hours at 40 litres/hr. No external heating was applied for the first hour after which the temperature was maintained at 80° C.

The reaction mixture was then stirred with 6 litres methanol, the polymer filtered off, washed with hot methanol, and dried in a vacuum oven at 60° C. 150 gm. of white granular polypropylene were obtained having an ash content of 0.31% and a solubility in boiling ether of 5.7%.

For comparison, a second experiment was carried out in the same way as in the first experiment, except that 5.7 gm. aluminium triethyl was used instead of 6 gm. diethyl aluminium chloride and 0.57 gm. aluminium triethyl. 260 gm. of polypropylene were obtained having an ash content of 0.18% and a solubility in boiling ether of 26.6%. The solubility of this polymer in ether is very much higher than that of the polymer obtained in the first experiment.

EXAMPLE 10

4.6 gm. dimethyl aluminium chloride and 9 gm. of the dry ground solid product obtained by reacting titanium tetrachloride with aluminium referred to in Example 9 were introduced into a 3-litre flask containing 2 litres benzene (analytical reagent grade) saturated with propylene. Propylene was then passed into the flask and the polymer recovered as described in Example 9. The maximum polymerisation temperatutre was 60° C.

18.4 gm. polypropylene having an ash content of 0.65% and a solubility in boiling ether of 8.3% were obtained.

The experiment was repeated using 4.6 gm. dimethyl aluminium chloride, 9 gm. of the said solid product and 0.36 gm. aluminium trimethyl. 31.7 gm. polypropylene were obtained having an ash content of 0.71% and a solubility in boiling ether of 1.9%.

EXAMPLE 11

Propylene was polymerised as described in Example 9 using 6 gm. diethyl aluminium chloride, 0.57 gm. aluminium triethyl, 8 gm. of the titanium tetrachloride-aluminium reaction product and 1600 ml. dry benzene (analytical reagent grade) as the diluent. Propylene was passed into the flask at 30 litres/hr. No external heat was applied during the first hour after which the temperature was maintained at 60° C.

After 7 hours the flow of propylene was discontinued and most of the benzene distilled from the reaction product which was then stirred with 3 litres methanol. The polymer was filtered off, washed with hot methanol and dried in a vacuum oven at 60° C. 289 gm. white granular polypropylene were obtained having an ash content of 0.50% and a solubility in boiling ether of 6.9%.

The experiment was repeated using sulphur-free toluene instead of benzene. 263 gm. polypropylene were obtained having an ash content of 0.17% and a solubility in boiling ether of 8.0%.

EXAMPLE 12

A 1-litre rocking autoclave was purged with nitrogen and then charged with 12 gm. diethyl aluminium chloride and 1.14 gm. aluminium triethyl dissolved in 50 ml. methyl cyclohexane and a glass phial containing 2 gm. of the titanium tetrachloride-aluminium reaction product referred to in Example 9. 500 gm. purified propylene were then introduced in the autoclave which was then rocked for 6 hours. The temperature of the contents of the autoclave was maintained at 60° C. and the maximum pressure attained was 30 atmosphere. 217 gm. polymer were obtained.

EXAMPLE 13

Aluminium reduced titanium tetrachloride (0.5 g. containing 0.0025 gram atoms of titanium) prepared as in Example 7 was dry ball milled for 19 hours under dry nitrogen and then suspended in petroleum ether (1,000 ml., B.P. >120° C.) which contained diethyl aluminium chloride (0.03 mole). The suspension was placed in a 2 litre autoclave from which oxygen and traces of water had been removed by flushing out with dry nitrogen; ethylene was then added to raise the pressure in the autoclave to 225 p.s.i. at 20° C. The autoclave was warmed to 50° C. and kept between 50° and 60° C. for 90 minutes. The final pressure was 40 p.s.i. Polythene (90 g.) was obtained on working up.

EXAMPLE 14

Aluminium reduced titanium tetrachloride (2.5 g. containing 0.125 gram atoms of titanium) prepared as in Example 7 was dry ball milled for 19 hours under dry nitrogen and then suspended in petroleum ether (1 litre, M.P. >120° C.) containing diethyl aluminium chloride (0.059 mole) and aluminium triethyl (0.006 mole) in a 2 litre flask. Ethylene was passed through the suspension at atmospheric pressure for 2½ hours while the temperature of the suspension was maintained at 70° C. The polymer was worked up by washing with a solution of nonanol (3,5,5-trimethyl hexan-1-ol) when polythene (54 g.) was obtained. This had a melt viscosity (at 190° C.) of $2 \times 10^7$ poises, density 0.946, an ash content of 0.16% and had 1.4 methyl groups per thousand carbon atoms

EXAMPLE 15

Aluminium reduced titanium tetrachloride (containing 0.05 gram atoms titanium) prepared as in Example 7 was ball-milled in the dry state under nitrogen for 16 hours and then suspended in a solution of 0.10 mole aluminium triethyl in 2 litres of petroleum ether previously saturated with propylene. Propylene (containing less than 100 p.p.m. methyl acetylene) was then passed through at 40 litres per hour under atmospheric pressure for 4 hours. The temperature of the polymerisation reaction and the yields of polypropylene obtained are shown in Table I.

Similar experiments were carried out using $TiCl_3$ instead of the said product, the temperatures and yields for which are also shown in Table I.

TABLE I

| Titanium compound | Temperature, °C. | Polymer yield (grams) |
|---|---|---|
| $TiCl_3$ | 40 | 62 |
| Al/$TiCl_4$ product | 40 | 145 |
| $TiCl_3$ | 60 | 177 |
| Al/$TiCl_4$ product | 60 | 283 |

EXAMPLE 16

Propylene was brought into contact with a mixture of (a) 9 gm. of the product obtained by reacting titanium tetrachloride with aluminium prepared as described in Example 7, the product having been ball-milled in the dry state for 16 hours, (b) 130 ml. of an 11% solution of aluminium triethyl in methyl cyclohexane, and (c) 2 litres of dry petroleum ether. The experiment was continued until about 100 gm. of solid polypropylene were produced.

140 ml. of nonanol were then added to the polymer slurry and the slurry was heated at 70° C. for 1 hour. The slurry which was initially lilac coloured became clear within a few minutes. The solid isotactic polypropylene finally obtained had an ash content of less than 0.1% and melted to give an off-white melt.

The above experiment was repeated under the same conditions using 8 gm. of titanium trichloride instead of the product obtained by reacting titanium tetrachloride with aluminium. Propylene was passed until about 250 gm. of solid polypropylene were produced and 180 ml. nonanol then added to the polymer slurry heated at 70° C. There was no perceptible change in the initial lilac colour of the slurry even after heating for 1½ hours. The ash content of the polymer was not determined since it was clearly of a high value.

EXAMPLE 17

The procedure of Example 4 was carried out using in place of the aluminium triethyl successively diethyl aluminium cyclohexenyl, aluminium tricyclohexyl, aluminium triphenyl, aluminium tribenzyl, and aluminium dipropylhydride when the yields and solubilities in ether of the polypropylene were substantially similar to those obtained in Example 4.

EXAMPLE 18

Aluminium reduced titanium tetrachloride (2 g. containing 0.01 gram atoms of titanium) obtained as in Example 7 was dry ball-milled for 15 hours under dry nitrogen and then suspended in petroleum ether (1 litre, B.P. >120° C.) which contained di-n-octyl aluminium chloride (0.02 moles). The suspension was placed in a 2 litre autoclave from which oxygen and traces of water had been removed by flushing out with dry nitrogen. Propylene (10 moles) was introduced into the reactor at a rate sufficient to maintain a pressure of 80 p.s.i. at 70° C. The temperature was kept at 70° C. for a further 12 hours. The polypropylene was worked up as described in Example 1 to give 305 g. polymer having a solubility in boiling ether of 9.5%, and an ash content of 0.02%.

EXAMPLE 19

Aluminium reduced titanium tetrachloride (1 g. containing 0.005 gram atoms of titanium) obtained as in Example 7 was suspended in petroleum ether (1.2 litres, B.P. >120° C.) which contained diethyl aluminium bromide (0.02 moles). Propylene was then polymerised as in Example 9 to give 270 gm. polymer having a solubility in boiling ether of 5.5% and an ash content of 0.06%.

EXAMPLE 20

In the ball milling operations referred to in Examples 3, 4, 5, 7, 8 and 9, the ball-mill used was of stainless steel, 4.1" diameter, 5.45" long, containing 250 half-inch diameter steel ballbearings. The aluminium reduced titanium tetrachloride was not weighed out exactly, but was of the order of 50-60 gm. (sufficient to "cover the ballbearings"). The mill was rotated at 78 r.p.m.

The effect of time of ball-milling on yield, atactic content (ether solubility) and bulk density is shown in Tables II-V.

In each table Al-TiCl$_4$=Al reduced TiCl$_4$ of which 30 gm. (0.15 gram atoms Ti) were used in every experiment.
In Table II the alkyl used was 0.05 moles Et$_2$AlCl in petroleum ether (B.P. >120° C.)
In Table III the alkyl used was 0.05 moles Et$_2$AlCl+0.005 moles Et$_3$Al in petroleum ether (B.P. >120° C.)
In Table IV the alkyl used was 0.05 moles Et$_2$AlCl in analytical reagent grade benzene.
In Table V the alkyl used was 0.05 moles Et$_2$AlCl+0.005 moles Et$_3$Al in analytical reagent grade benzene.
Et=ethyl.

All polymerisations were carried out on the 3-litre scale, propylene being passed at 35 litres/hour for 4 hours. Where benzene was used the temperature was 60° C.; where petroleum ether was used the temperature was maintained at 80° C. Purified propylene was used in all cases, in which the methyl acetylene and allene content was less than 100 p.p.m.

TABLE II

| Time (hr.) for ball-milling aluminium reduced TiCl$_4$ | Yield, g. | Ether solubility, percent | Bulk density, g./ml. |
| --- | --- | --- | --- |
| 5 | 31 | 11 | .21 |
| 15 | 111 | 8.3 | .378 |
| 25 | 178 | 5.0 | .392 |
| 30 | 123 | 7.0 | .33 |
| 40 | 125 | 5.0 | .368 |
| 50 | 170 | 6.0 | .406 |
| 60 | 140 | 8.5 | .292 |

TABLE III

| Time (hr.) for ball-milling aluminium reduced TiCl$_4$ | Yield, g. | Ether solubility, percent | Bulk density, g./ml. |
| --- | --- | --- | --- |
| 5 | 42 | 14 | .18 |
| 15 | 156 | 6.0 | .396 |
| 25 | 215 | 5.0 | .354 |
| 30 | 154 | 8.0 | .388 |
| 40 | 148 | 9.0 | .392 |
| 50 | 204 | 7.0 | .392 |
| 60 | 198 | 9.0 | .36 |
| 65 | 220 | 8.0 | .40 |

TABLE IV

| Time (hr.) for ball-milling aluminium reduced TiCl$_4$ | Yield, g. | Ether solubility, percent | Bulk density, g./ml. |
| --- | --- | --- | --- |
| 5 | 50.5 | 11 | .16 |
| 15 | 174 | 8 | .34 |
| 25 | 289 | 5.0 | .378 |
| 30 | 167 | 9.0 | .36 |
| 40 | 258 | 7.5 | .33 |
| 50 | 253 | 6.5 | .392 |
| 60 | 225 | 8.0 | .337 |
| 65 | 285 | 8.2 | .40 |

TABLE V

| Time (hr.) for ball-milling aluminium reduced TiCl$_4$ | Yield, g. | Ether solubility, percent | Bulk density, g./ml. |
| --- | --- | --- | --- |
| 5 | 87 | 12.5 | .136 |
| 15 | 226 | 9.0 | .318 |
| 25 | 325 | 5.0 | .364 |
| 30 | 219 | 9.0 | .336 |
| 40 | 276 | 8.0 | .353 |
| 50 | 303 | 5.0 | .376 |
| 60 | 324 | 8.5 | .338 |
| 65 | 360 | 7.4 | .367 |

EXAMPLE 21

The following polymerisations illustrate the effects of varying the Et$_2$AlCl/AlEt$_3$ ratio. The polymerisations were carried out at atmospheric pressure in benzene as a diluent and except where otherwise stated the reaction time was 6 hours. The product obtained by aluminium reduction of TiCl$_4$ was dry-ball-milled for 16 hrs. as in Example 20. The yields and ether solubilities obtained are shown in Table VI.

TABLE VI

| Al reduced TiCl$_4$ (g. atom Ti) | AlEt$_2$Cl (mols.) | AlEt$_3$ (mols.) | Yield (g.) | Ether sol. (percent) | Reaction time (hr.) |
| --- | --- | --- | --- | --- | --- |
| 0.15 | | 0.05 | 87 | 34 | 6 |
| 0.15 | | .05 | 316 | 21 | 4 |
| 0.15 | .05 | | 104 | 10 | 6 |
| 0.15 | .05 | | 88 | 9 | 6 |
| 0.15 | .05 | .0025 | 241 | 7 | 6 |
| 0.15 | .05 | .0025 | 104 | 12 | 6 |
| 0.15 | .05 | .0025 | 279 | 5.5 | 6 |
| 0.15 | .05 | .005 | 259 | 7 | 6 |
| 0.15 | .05 | .005 | 219 | 7 | 6 |
| 0.15 | .05 | .005 | 207 | 8 | 6 |
| 0.15 | .05 | .005 | 240 | 8 | 4 |
| 0.15 | .05 | .005 | 203 | 8 | 6 |
| 0.15 | .05 | .005 | 217 | 8 | 6 |
| 0.15 | .05 | .01 | 147 | 8 | 6 |
| 0.15 | .05 | .01 | 230 | 11.5 | 4 |
| 0.15 | .05 | .01 | 279 | 5.5 | 6 |
| 0.15 | .05 | .025 | 286 | 13 | 5 |
| 0.15 | .05 | .05 | 301 | 20 | 5 |
| 0.075 | .05 | .005 | 90 | 10 | 6 |
| 0.15 | .075 | .005 | 112 | 13.5 | 6 |
| 0.15 | .075 | .005 | 291 | 6 | 6 |
| 0.225 | .05 | .01 | 353 | 6 | 6 |

EXAMPLE 22

The following polymerisations illustrate the effect of varying the Et$_2$AlCl/AlEt$_3$ ratio at different Et$_2$AlCl/aluminium reduced TiCl$_4$ ratios. The polymerisations were carried out at atmospheric pressure in benzene as a diluent at 60° C. Purified propylene was passed in each case at atmospheric pressure for 4 hrs. The aluminium reduced titanium tetrachloride was dry ball-milled for 16 hrs. as in Example 20. The yields and ether solubilities obtained are shown in Table VII.

TABLE VII

| Aluminium reduced TiCl$_4$ (mols.) | Et$_3$AlCl (moles) | AlEt$_3$ (moles) | Et$_2$AlCl/ Al reduced TiCl$_4$ ratio | AlEt$_3$/ Et$_2$AlCl (mole percent) | Yield (g.) | Ether solubility (percent) |
| --- | --- | --- | --- | --- | --- | --- |
| 0.15 | 0.2 | | 1.3:1 | | 119 | 4.1 |
| 0.15 | 0.2 | 0.01 | 1.3:1 | 5 | 79 | 5.5 |
| 0.15 | 0.2 | 0.01 | 1.3:1 | 5 | 141 | 3.9 |
| 0.15 | 0.2 | 0.04 | 1.3:1 | 20 | 138 | 4.0 |
| 0.15 | 0.2 | 0.04 | 1.3:1 | 20 | 192 | 4.0 |
| 0.15 | 0.2 | 0.04 | 1.3:1 | 20 | 208 | 3.3 |
| 0.15 | 0.2 | 0.04 | 1.3:1 | 20 | 203 | 2.6 |
| 0.15 | 0.2 | 0.06 | 1.3:1 | 30 | 187 | 3.4 |
| 0.15 | 0.2 | 0.06 | 1.3:1 | 30 | 164 | 11.2 |
| 0.15 | 0.2 | 0.06 | 1.3:1 | 30 | 180 | 4.2 |
| 0.15 | 0.2 | 0.08 | 1.3:1 | 40 | 209 | 6.3 |
| 0.15 | 0.025 | | 1:6 | | 85 | 5.7 |
| 0.15 | 0.025 | 0.005 | 1:6 | 20 | 148 | 6.7 |
| 0.15 | 0.025 | 0.010 | 1:6 | 40 | 200 | 5.0 |
| 0.15 | 0.025 | 0.015 | 1:6 | 60 | 150 | 10.6 |
| 0.15 | 0.025 | 0.015 | 1:6 | 60 | 213 | 7.6 |

EXAMPLE 23

Aluminium reduced titanium tetrachloride (1 g., 0.005 gram atoms titanium), prepared as in Example 7 was ball-milled for 16 hours under nitrogen and then suspended in 2 litres petroleum ether (B.P. 60–80° C.), which contained diethyl aluminium chloride (0.026 moles) in an autoclave. Butene-1 (500 ml.) was added and the autoclave heated for 5 hr. at 70° C. when the maximum pressure was 40 p.s.i. The polymer was isolated by precipitation with methanol and was washed with methanol and dried to give polybutene-1 (165 g.) 80% of which was insoluble in ether.

EXAMPLE 24

The process of Example 23 was repeated using 250 ml. butene-1 and slowly admitting ethylene (200 g.) as the polymerisation proceeded. The reaction mixture was vigorously stirred and the maximum pressure was about 60 p.s.i. The polymer was isolated by precipitation with methanol and washed with methanol and dried to give a solid rubbery copolymer of ethylene and butene-1. Ethylene and propylene may also be copolymerised in the same manner.

EXAMPLE 25

The process of Example 23 was repeated at a temperature of up to 50° using 300 ml. styrene which was added over 50 min. with cooling to keep the temperature below 50°. The polymer was isolated as in Example 23 and then extracted with ether to remove amorphous polymer. 140 g. of white crystalline polysytrene were obtained.

EXAMPLE 26

The reaction product of aluminium and titanium tetrachloride was prepared substantially as in Example 1 with the exception that a finely powdered "pigment grade" aluminium (which contained a small proportion of stearic acid) was used and the aluminium chloride omitted. The product was substantially the same as that obtained in Example 1 and had a similar catalytic activity in the polymerisation olefines.

A similar preparation using benzene as the solvent gave a substantially similar product.

We claim:

1. An olefine polymerisation catalyst which consists essentially of:
   (a) an organo-aluminum compound which contains at least one hydrocarbon radical attached to an aluminum atom, any remaining metal valencies being satisfied by hydrogen or halogen atoms; and
   (b) the product of reacting Al and $TiCl_4$ which consists essentially of a material wherein Al, Ti and Cl are present in an atomic ratio of about 1:3:12 and which is stable up to 250° C. in vacuo in the ratio moles of organo-aluminum compound to moles of component (b) in the range 1:10 to 10:1.

2. The catalyst of claim 1 wherein the organo-aluminum compound is selected from the group consisting of aluminum alkyls, aluminum alkyl halides, aluminum alkyl hydrides and complex alkyls of aluminum and an alkali metal.

3. The catalyst of claim 1 wherein the reaction product (b) has been milled.

4. Th catalyst of claim 1 wherein the organo-aluminum compound is a dialkyl aluminum chloride in combination with between 5 and 20 mole percent, based on said dialkyl aluminum chloride of an aluminum trialkyl.

5. A process for producing an olefine polymerisation catalyst in which
   (a) an organo-aluminum compound which contains at least one hydrocarbon radical attached to an aluminum atom, any remaining metal valencies being satisfied by hydrogen, or halogen atoms; and
   (b) the product of reacting Al and $TiCl_4$ which consists essentially of a material wherein Al, Ti and Cl are present in an atomic ratio of about 1:3:12 and which is stable up to 250° C. in vacuo are mixed together in the ratio moles of organo-aluminum compound to moles of component (b) in the range 1:10 to 10:1.

6. The process of claim 5 wherein the organo-aluminum compound is selected from the group consisting of aluminum alkyls, aluminum alkyl halides, aluminum alkyl hydrides and complex alkyls of aluminum and an alkali metal.

7. A process for producing an olefine polymerisation catalyst wherein Al and $TiCl_4$ are heated together to give a solid reaction product, any excess $TiCl_4$ is removed from said product to give a catalyt component which consists essentially of a material wherein Al, Ti and Cl are present in an atomic ratio of about 1:3:12 and which is stable up to 250° C. in vacuo and an organo-aluminum compound which contains at least one hydrocarbon radical attached to an aluminum atom, any remaining metal valencies being satisfied by hydrogen, or halogen atoms, is added to the reaction product in the proportion of 0.1 to 10 moles of organo-aluminum compound for each mole of the reaction product.

8. The process of claim 7 including the additional step of milling the said reaction product and then adding the organo-aluminum compound to the milled product.

9. A process for producing an olefine polymerisation catalyst wherein Al and $TiCl_4$ are heated together at a temperature in a range up to about the boiling temperature of $TiCl_4$ to give a solid reaction product, removing excess unreacted $TiCl_4$ and adding to the reaction product an organo-aluminum compound in the proportion of 0.1 to 10 moles of organo-aluminum compound for each mole of the reaction product wherein the organo-aluminum compound contains at least one hydrocarbon radical attached to an aluminum atom, any remaining metal valencies being satisfied by hydrogen or halogen atoms.

10. The process of claim 9 wherein the reaction product is obtained as a powder and is ground in a ball mill prior to adding the organo-aluminum compound.

11. A process for polymerising hydrocarbon monoolefines containing up to 8 carbon atoms which comprises contacting at least one such olefine with a catalyst which consists essentially of:
    (a) an organo-aluminum compound which contains at least one hydrocarbon radical attached to an aluminum atom, any remaining metal valencies being satisfied by hydrogen or halogen atoms; and
    (b) the product of reacting Al and $TiCl_4$ which consists essentially of a material wherein Al, Ti and Cl are present in an atomic ratio of about 1:3:12 and which is stable up to 250° C. in vacuo in the ratio moles of organo-aluminum compound to moles of component (b) in the range 1:10 to 10:1.

12. A process as claimed in claim 11 in which the polymerization temperature is maintained within the range 20 to 100° C.

13. A process as claimed in claim 11 in which the organo-aluminum compound is selected from the group consisting of aluminum alkyls, aluminum alkyl halides, aluminum alkyl hydrides and complex alkyls of aluminum and an alkali metal.

14. A process as claimed in claim 11 wherein propylene is polymerized.

15. A catalyst useful for polymerising monoolefines containing up to 8 carbon atoms, said catalyst consisting essentially of a mixture of:
    (a) an organo-aluminum compound which contains at least one hydrocarbon radical attached to an aluminum atom, any remaining valencies being satisfied by hydrogen or halogen atoms; and
    (b) a composition consisting essentially of aluminum, titanium and chlorine in which these atoms are in atomic ratio of about 1:3:12 and the aluminum is bound with titanium and chloride in crystal lattices which are stable at 250° C., in vacuo and in which the titanium is essentially all combined in the trivalent state, said composition being made by the reaction of titanium tetrachloride and aluminum and the ratio moles of organo-aluminum compound to moles of component (b) is in the range 1:10 to 10:1.

16. A process for polymerising hydrocarbon mono-olefines containing up to 8 carbon atoms which comprises contacting at least one such olefine with a catalyst consisting essentially of a mixture of:
  (a) an organo-aluminum compound which contains at least one hydrocarbon radical attached to an aluminum atom, any remaining valencies being satisfied by hydrogen or halogen atoms; and
  (b) a composition consisting essentially of aluminum, titanium and chlorine in which these atoms are in atomic ratio of about 1:3:12 and the aluminum is bound with titanium and chlorine in crystal lattices which are stable at 250° C., in vacuo and in which the titanium is essentially all combined in the trivalent state, said composition being made by heating together titanium tetrachloride and aluminum and the ratio moles of organo-aluminum compound to moles of component (b) is in the range 1:10 to 10:1.

17. A process for producing an olefine polymerisation catalyst wherein Al and $TiCl_4$ are heated together at a temperature in a range up to about 200° C. to give a solid reaction product, removing excess unreacted $TiCl_4$ and adding to the reaction product an organo-aluminum compound in the proportion of 0.1 to 10 moles of organo-aluminum compound for each mole of the reaction product wherein the organo-aluminum compound contains at least one hydrocarbon radical attached to an aluminum atom, any remaining metal valencies being satisfied by hydrogen or halogen atoms.

References Cited

UNITED STATES PATENTS

| | | | |
|---|---|---|---|
| 3,128,252 | 4/1964 | Tornqvist et al. | 252—429 A |
| 3,032,510 | 5/1962 | Tornqvist et al. | 252—429 |
| 3,032,513 | 5/1962 | Tornqvist et al. | 252—429 |
| 2,893,984 | 7/1959 | Seelbach et al. | 260—93.7 |
| 2,980,660 | 4/1961 | Ralls | 260—94.9 |
| 2,899,413 | 8/1959 | Hagemeyer et al. | 260—94.9 |
| 2,886,561 | 5/1959 | Reynolds et al. | 260—94.9 |

FOREIGN PATENTS

| | | | |
|---|---|---|---|
| 1,132,506 | 11/1956 | France | 260—94.9 |
| 789,781 | 1/1958 | Great Britain | 260—94.9 |
| 526,101 | 5/1955 | Italy | 260—93.7 |

OTHER REFERENCES

Zeitschrift fur Anorganische Chemie, by Ruff et al. Vol. 28 (1923) pp. 81–95.

PATRICK P. GARVIN, Primary Examiner

U.S. Cl. X.R.

260—94.9 B; 252—429 C